(12) United States Patent
Handiganoor et al.

(10) Patent No.: US 12,327,106 B2
(45) Date of Patent: Jun. 10, 2025

(54) DYNAMIC SWITCHING OF COMMUNICATION PROTOCOLS FOR OVER-THE-AIR VEHICLE UPDATES

(71) Applicant: FCA US LLC, Auburn Hills, MI (US)

(72) Inventors: Vinoot Handiganoor, Bangalore (IN); Siva Krishna Kattinti, Telangana (IN); Akshara Nallamala, Telangana (IN); Priyanka Arudra, Telangana (IN)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/456,694

(22) Filed: Aug. 28, 2023

(65) Prior Publication Data

US 2025/0077213 A1    Mar. 6, 2025

(51) Int. Cl.
*G06F 8/65*  (2018.01)
*H04L 67/00*  (2022.01)
*H04L 69/18*  (2022.01)

(52) U.S. Cl.
CPC .............. *G06F 8/65* (2013.01); *H04L 67/34* (2013.01); *H04L 69/18* (2013.01)

(58) Field of Classification Search
CPC ............ G06F 8/65; H04L 67/34; H04L 69/18
USPC ........................................................ 709/217
See application file for complete search history.

(56) References Cited

U.S. PATENT DOCUMENTS

| | | | |
|---|---|---|---|
| 6,990,082 B1 * | 1/2006 | Zehavi | .............. H04W 88/06 370/280 |
| 9,464,905 B2 * | 10/2016 | Lewis | .............. H04W 12/0471 |
| 9,600,266 B2 | 3/2017 | Molin et al. | |
| 9,715,378 B2 | 7/2017 | Dickerson et al. | |
| 10,240,935 B2 | 3/2019 | Breed | |
| 10,496,394 B2 | 12/2019 | Frantz et al. | |
| 11,334,344 B2 | 5/2022 | Graham et al. | |
| 11,340,887 B2 | 5/2022 | Thurimella | |
| 11,659,370 B2 | 5/2023 | Lee et al. | |
| 2019/0108010 A1 * | 4/2019 | Tillman | .................. H04L 67/12 |
| 2024/0168747 A1 * | 5/2024 | Klinemeier | ............. G06F 9/542 |

FOREIGN PATENT DOCUMENTS

CN    115604773 A  *  1/2023
CN    116647607 A  *  8/2023

* cited by examiner

*Primary Examiner* — Wing F Chan
*Assistant Examiner* — John Fan
(74) *Attorney, Agent, or Firm* — Jeremy J. Klobucar

(57) ABSTRACT

Over-the-air (OTA) update control techniques for a vehicle include determining a set of available communication protocols from a plurality of different communication protocols wherein the set of available communication protocols are those of the plurality of different communication protocols that the controller is configured for receiving OTA update data from the remote update server via the communication transceiver, for each of the set of available communication protocols, determining a desirability score, wherein each desirability score indicates a level of desirability of the available communication protocol for transferring the OTA update data, selecting the communication protocol having a highest desirability score from the set of available communication protocols, controlling receiving of the OTA update data from the remote update server via communication transceiver and the selected communication protocol, and updating software or firmware executable by the controller using the received OTA update data.

14 Claims, 4 Drawing Sheets

DYNAMIC SWITCHING OF COMMUNICATION PROTOCOLS FOR OVER-THE-AIR VEHICLE UPDATES

FIELD

The present application generally relates to vehicle control and communication systems and, more particularly, to techniques for dynamic switching of communication protocols for over-the-air (OTA) vehicle updates.

BACKGROUND

Today's vehicles typically receive software and/or firmware upgrades "over-the-air" (OTA) or wirelessly (e.g., via a cellular network) from a remote update server. These upgrades include, for example, bug fixes and software/firmware updates. As software/firmware complexity in vehicles increases, such as due to the advancement of advanced driver-assistance (ADAS) and autonomous driving features, so does the demand for more effective and adaptable OTA update systems. In other words, some communication protocols for OTA updates may be inadequate (i.e., too low of a bandwidth or data transfer rate) to reliably perform larger OTA updates. Having to wait for excessive OTA update transmission/download periods and/or having to repeatedly attempt to download vehicle OTA updates (e.g., due to one or more failed attempts) results in a poor user experience. Accordingly, while such conventional vehicle OTA update systems do work for their intended purpose, there exists an opportunity for improvement in the relevant art.

SUMMARY

According to one example aspect of the invention, an over-the-air (OTA) update control system for a vehicle is presented. In one exemplary implementation, the OTA update control system comprises a communication transceiver configured for communication with a remote update server via a plurality of different communication protocols and a controller connected to the communication transceiver and configured to determine, from the plurality of different communication protocols, a set of available communication protocols that the controller is configured to utilize for receiving OTA update data, determine, for each of the set of available communication protocols, a desirability score, wherein each desirability score indicates a level of desirability of the available communication protocol for transferring the OTA update data, select the communication protocol having a highest desirability score from the set of available communication protocols, control receiving of the OTA update data from the remote update server and via the communication transceiver and the selected communication protocol, and update software or firmware executable by the controller using the received OTA update data, In some implementations, the controller is configured to determine the desirability score based on a heartbeat exchange procedure between the remote update server and the vehicle, and wherein the heartbeat exchange procedure results in a heartbeat period. In some implementations, the heartbeat exchange procedure includes the receipt of a heartbeat message by the controller, via the communication transceiver and from the remote update server, and the transmission of a heartbeat response by the controller, via the communication transceiver and to the remote update server, and the heartbeat period is defined from the transmission of the heartbeat message until the reception of the heartbeat response by the remote update server. In some implementations, the desirability score includes a comparison of the heartbeat period to different heartbeat period thresholds associated with the plurality of available communication protocols, respectively.

In some implementations, the plurality of different communication protocols includes at least (i) file transfer protocol (FTP), (ii) advanced message queuing protocol (AMQP), (iii) hypertext transfer protocol (HTTP), (iv) constrained application protocol (CoAP), and (v) message queue telemetry transport (MQTT). In some implementations, the plurality of different communication protocols consists of (i) FTP, (ii) AMQP, (iii) HTTP, (iv) CoAP, and (v) MQTT. In some implementations, the controller is configured to utilize the MQTT protocol as a base or default protocol. In some implementations, the controller is configured to select one of FTP, AMQP, HTTP, CoAP, and MQTT based on a comparison between the heartbeat period and respective heartbeat period thresholds, wherein the different heartbeat thresholds are, ordered from shortest to longest, associated with FTP, AMQP, HTTP, CoAP, and MQTT. In some implementations, the desirability score is a weighted score based on a plurality of different parameters associated with at least the OTA update data and the plurality of available communication protocols.

According to another example aspect of the invention, an OTA update control method for a vehicle is presented. In one exemplary implementation, the OTA update control method comprises determining, by a controller, a set of available communication protocols from a plurality of different communication protocols for communication between a communication transceiver and a remote update server, wherein the set of available communication protocols are those of the plurality of different communication protocols that the controller is configured for receiving OTA update data from the remote update server via the communication transceiver, for each of the set of available communication protocols, determining, by the controller, a desirability score, wherein each desirability score indicates a level of desirability of the available communication protocol for transferring the OTA update data, selecting, by the controller, the communication protocol having a highest desirability score from the set of available communication protocols, controlling, by the controller, receiving of the OTA update data from the remote update server via communication transceiver and the selected communication protocol, and updating, by the controller, software or firmware executable by the controller using the received OTA update data.

In some implementations, the desirability score is determined, by the controller, based on a heartbeat exchange procedure between the remote update server and the vehicle, and wherein the heartbeat exchange procedure results in a heartbeat period. In some implementations, the heartbeat exchange procedure includes the receipt of a heartbeat message by the controller, via the communication transceiver and from the remote update server, and the transmission of a heartbeat response by the controller, via the communication transceiver and to the remote update server, and the heartbeat period is defined from the transmission of the heartbeat message until the reception of the heartbeat response by the remote update server. In some implementations, the desirability score includes a comparison of the heartbeat period to different heartbeat period thresholds associated with the plurality of available communication protocols, respectively.

In some implementations, the plurality of different communication protocols includes at least (i) FTP, (ii) AMQP, (iii) HTTP, (iv) CoAP, and (v) MQTT In some implementations, the plurality of different communication protocols consists of (i) FTP, (ii) AMQP, (iii) HTTP, (iv) CoAP, and (v) MQTT. In some implementations, the controller is configured to utilize the MQTT protocol as a base or default protocol. In some implementations, the controller is configured to select one of FTP, AMQP, HTTP, CoAP, and MQTT based on a comparison between the heartbeat period and respective heartbeat period thresholds, wherein the different heartbeat thresholds are, ordered from shortest to longest, associated with FTP, AMQP, HTTP, CoAP, and MQTT. In some implementations, the desirability score is a weighted score based on a plurality of different parameters associated with at least the OTA update data and the plurality of available communication protocols.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
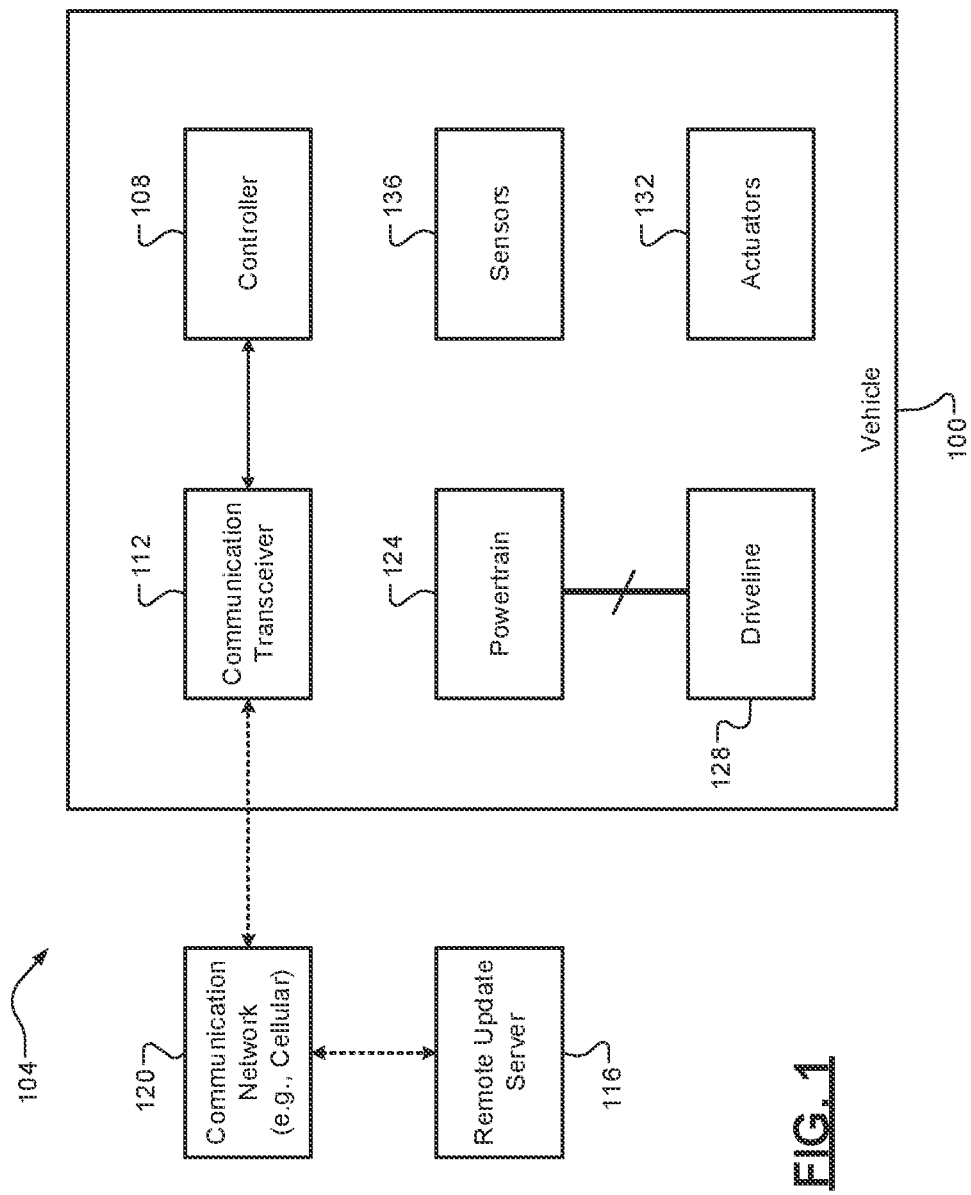
FIG. 1 is a functional block diagram of a vehicle having an example over-the-air (OTA) update control system according to the principles of the present application.
Figure 2:
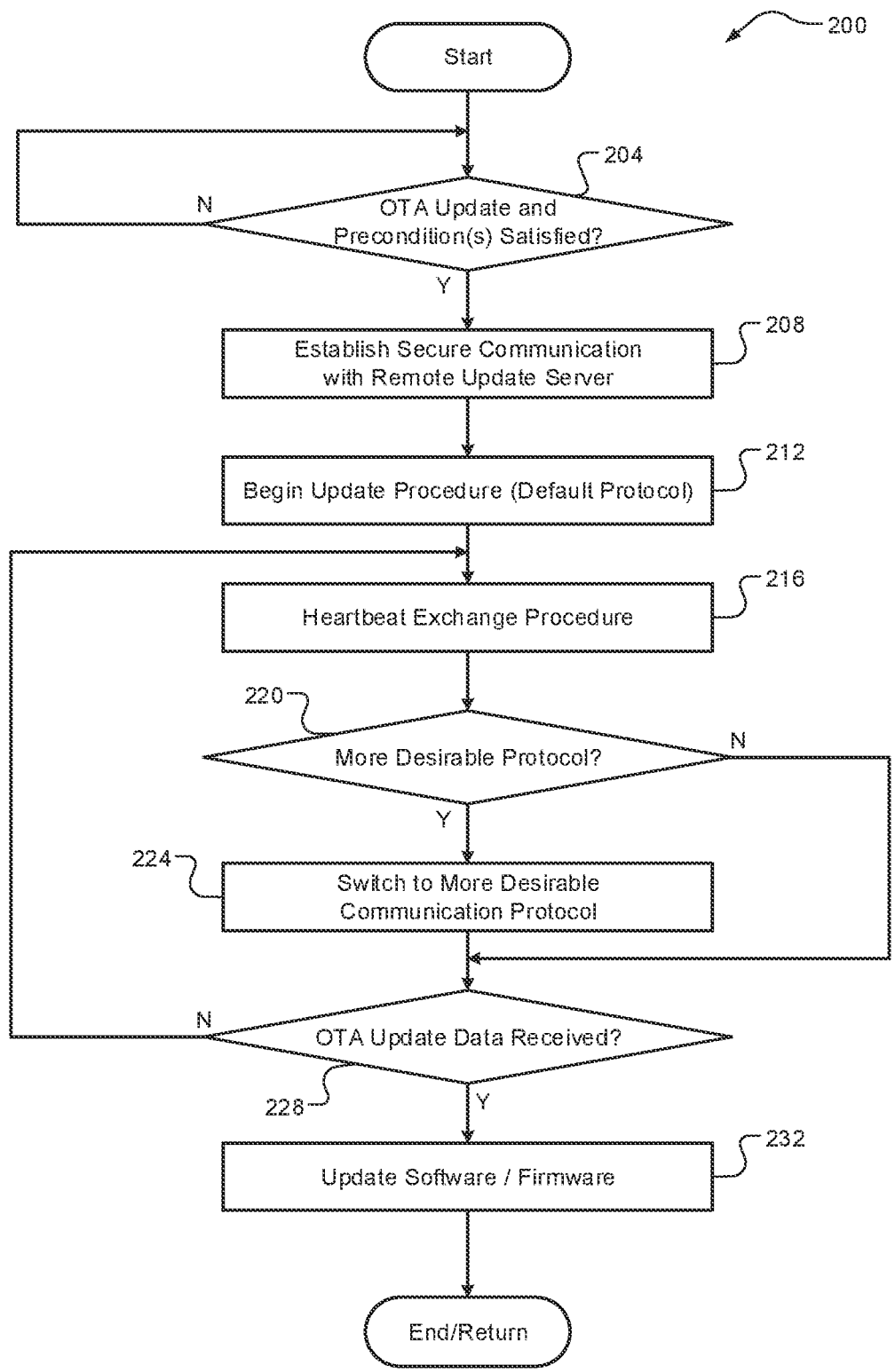
FIG. 2 is a flow diagram of an example OTA update control method for a receiving and installing OTA update data at a vehicle according to the principles of the present application.

As previously discussed, today's vehicles typically receive software and/or firmware upgrades "over-the-air" (OTA) or wirelessly (e.g., via a cellular network) from a remote update server. These upgrades include, for example, bug fixes and software/firmware updates. As software/firmware complexity in vehicles increases, such as due to the advancement of advanced driver-assistance (ADAS) and autonomous driving features, so does the demand for more effective and adaptable OTA update systems. OTA updates in the automotive sector face a number of communication protocol issues. Original equipment manufacturers (OEMs) must deal with bandwidth and communication challenges, guarantee component compatibility, and carefully weigh the costs of delivering OTA updates. Conventional OTA update systems are often associated with poor user experiences. One obstacle is bandwidth limitations/restrictions, which can be problematic because the OTA update process can be lengthy and ineffective in many circumstances because automobiles are frequently only able to connect to the internet through channels with constrained capacity. Another obstacle is connectivity problems, due to variables such as network congestion, weak signals, and other environmental considerations, which could result in OTA updates failing or taking longer than anticipated.

Accordingly, improved OTA update control systems and methods for vehicles are presented herein. The OTA update control techniques of the present application determine a "best" communication protocol from plurality of different communication protocols. Through the use of a technique called dynamic protocol switching, OTA updates can smoothly switch between various communication protocols. When the network conditions change while the update is being performed or when the updating device has limited bandwidth or resources, this can be especially helpful. Dynamic protocol switching can assist ensure that OTA updates are delivered efficiently and reliably, regardless of the method selected and even in difficult network conditions. Non-limiting examples include Internet-of-Things (IoT) Internet protocols such as more common file transfer protocol (FTP) and hypertext transfer protocol (HTTP) and newer advanced message queuing protocol (AMQP), constrained application protocol (CoAP), and message queue telemetry transport (MQTT).

It will be appreciated that these are merely example communication protocols and that other IoT protocols could be used additionally or alternatively, such as data distribution service (DDS), extensible messaging and presence protocol (XMPP), simple object access protocol (SOAP), and/or universal plug and play (UPnP). The HTTP protocol is simple, widely used, supports caching, and supports authentication and encryption through HTTPs. The FTP protocol supports large file transfers, allows resuming interrupted transfers, and also supports authentication and encryption. The MQTT protocol is lightweight and designed for IoT and other low-bandwidth, high-latency environments, supports Quality of Service (QOS) levels for reliability, and supports a publish-subscribe model. The AMQP protocol supports complex message routing, supports QoS levels for reliability, and supports publish-subscribe and point-to-point messaging models. Lastly, the CoAP protocol is designed for constrained devices and networks, supports caching and proxying, and supports multicast messaging. These protocols are all created to be compact and effective, which makes them suitable for usage in devices with multiple constraints.

First, a vehicle's controller determines which communication protocols are available for use to receive OTA update data. For example, some communication protocols may be temporarily unavailable and/or newer communication protocols may not be available on older/legacy vehicles. The client (vehicle controller) and server (remote OTA update server) then perform a heartbeat exchange procedure, which is essentially a timed ping signal and response (i.e., a time from transmission until receipt, if any). This heartbeat period indicates a quality (e.g., speed) of connection that the vehicle's controller currently has. Based on this heartbeat period (and possibly other weighted factors (OTA update data size, other cost/benefit analysis, etc.), a communication protocol for receiving the OTA update data is selected. Each available communication protocol (FTP, AMQP, HTTP, CoAS, MQTT, etc.) could have an associated speed and thus heartbeat period threshold associated therewith. For example, the heartbeat threshold periods could be, from shortest (fastest protocol) to longest (slowest protocol), <~10 milliseconds (ms) (FTP), 10-100 ms (AMQP), ~100 ms to ~1 second(s) (HTTP), ~1 s to ~5 s (CoAP), and a base or default (MQTT). After the communication protocol is selected, it is utilized to receive the OTA update data, which is then used to update the controller's firmware/software.

Referring now to FIG. 1, a functional block diagram of a vehicle 100 having an example OTA update control system 104 according to the principles of the present application is illustrated. The OTA update control system 104 generally includes a controller 108 of the vehicle 100 and an associated communication transceiver 112 connected to the controller 108. The controller 108 is configured to control operation of the vehicle 100, as well as perform at least a portion of the techniques of the present application, which will be discussed in greater detail below. The communication transceiver 112 is configured for communication with a remote update server 116 via one or more long-range wireless communication networks 120 (e.g., a cellular communication network; also referred to generally herein as "communication network 120") and via a plurality of different communication protocols. The vehicle 100 also generally comprises a powertrain 124 configured to generate and transfer drive torque to a driveline 128 for propulsion. Non-limiting examples of the powertrain 124 include an internal combustion engine, an electric motor, and combinations thereof. The vehicle 100 further comprises other actuators 132 and sensors 136 for controlling various subsystems or components of the vehicle 100 (e.g., the powertrain 124) and monitoring operation parameters of the vehicle 100.

Referring now to FIGS. 2 and 3A-3C, flow diagrams of an example OTA update control method 200 including receiving and installing OTA update data by a vehicle and example sub-routines or sub-methods 300, 330, and 360 according to the principles of the present application is illustrated. While the components of vehicle 100 and the example OTA update control system 104 are specifically referenced for illustrative/descriptive purposes, it will be appreciated that the method 200 could be applicable to any suitable vehicle. At 204, the controller 108 determines whether an OTA update is necessary and whether a set of preconditions for doing so are satisfied. An OTA update could be necessary, for example, when the vehicle 100 receives an OTA update notification or request, such as via communication network (e.g., a cellular communication network). The precondition(s) could include, for example, the vehicle 100 being powered up (or at least its componentry being powered up) and there being no malfunctions or faults present that would otherwise inhibit or prevent the OTA update procedure of the present application. When false, the method 200 ends or returns to 204. When true, the method 200 proceeds to 208 or 212. At optional 208, the controller 108 establishes a secure connection with the remote update server 116 via the communication network. It will be appreciated that this step 208 could have already been performed as a precondition for the method 200. This OTA update procedure could begin, for example, using a base or default communication protocol (e.g., MQTT), which could be utilized at a start of the OTA update procedure process at 212.

Figures 3A, 3B:
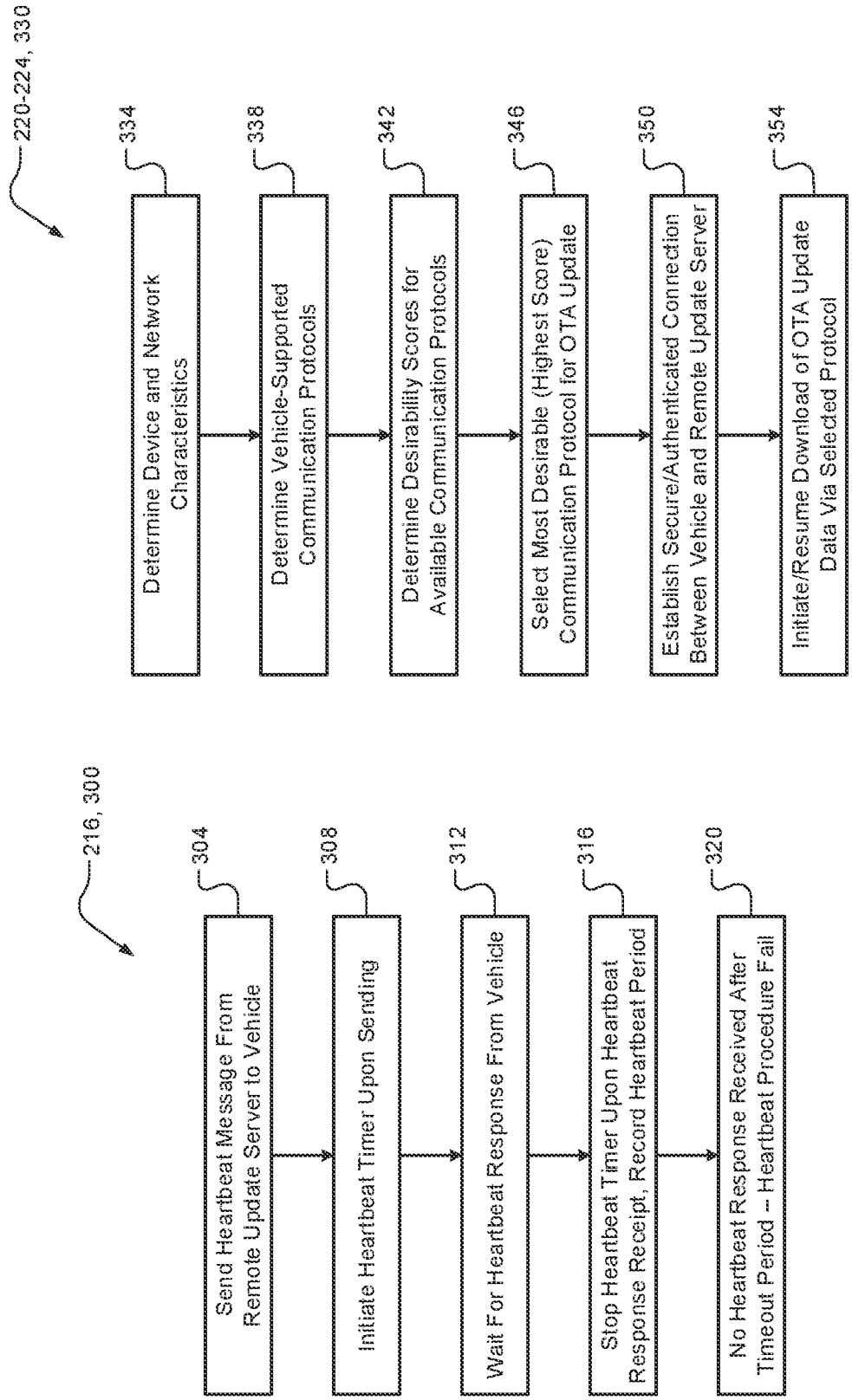
FIGS. 3A-3C are flow diagrams of example sub-methods or sub-routines of the example OTA update control method of FIG. 2 according to the principles of the present application.

At 216, the controller 108 receives, via the communication transceiver 116 and from the remote update server 116 via the communication network 120, a heartbeat message (e.g., a ping signal) and, in response, transmits a heartbeat response back to the remote update server 116 via the communication transceiver 116 and the communication network. FIG. 3A illustrates an example flow diagram of the heartbeat message exchange procedure 300 of step 216 in greater detail according to some implementations of the present application. At 304, the heartbeat message is sent from the remote update server 116 to the vehicle 100 and at 308 a heartbeat timer is initiated. At 312, the remote update server 116 waits for a heartbeat response from the vehicle 100. At 316, the heartbeat response is received from the vehicle 100 and the remote update server 116 stops the heartbeat timer and obtains the heartbeat period (i.e., time from transmission until receipt). At 320, a timeout occurs when the heartbeat response is not received within a timeout period and the heartbeat message exchange procedure fails. In this scenario, the associated protocol could be disregarded or no longer considered for usage. Once the heartbeat period is obtained at 216, the method 200 continues to 220.

At 220, the controller 108 determines if there is a more desirable protocol to switch to. In other words, the controller 108 determines whether one of the available communication protocols is currently more desirable (based on a variety of factors, including the heartbeat period and a respective heartbeat threshold) than a current protocol (e.g., the default protocol, such as MQTT). FIG. 3B illustrates an example flow diagram of the communication protocol desirability analysis 330 of step 220 in greater detail according to some implementations of the present application. At 334, the controller 108 determines a set of device and network characteristics. One example characteristic is latency—i.e., the time that passes between initiating a data transfer and the actual start of data transmission. The amount of time it takes for data to move from the source device to the destination device is frequently expressed in ms. Another example characteristic is reliability—i.e., a network connection's consistency and stability. Data packets are transferred without considerable loss or disruptions. Another example characteristic is range—i.e., the range across which devices can connect and stay connected. This depends on the networking technology being utilized, such as wired connections like Ethernet, Bluetooth, cellular networks, or Wi-Fi.

Yet another example characteristic is security—i.e., an important component of connectivity, especially when sending or accessing sensitive data. To prevent unauthorized access to data, secure communication uses authentication procedures, encryption technologies, and other safeguards. A final example characteristic is scalability—a network's or a device's capacity to support an expanding number of users or connected devices without sacrificing performance. At 338, the controller 108 determines a set of available communication protocols from the plurality of different communication protocols (i.e., protocols that the controller 108 is configured to utilize). At 342, based on the gathered data, the controller 108 determines a desirability score for each of the available communication protocols. This desirability score indicates a level or degree of desirability of a particular communication protocol for use in transmission/downloading of the OTA update data. In one example embodiment, this is primarily based on comparisons between the heartbeat period and respective heartbeat period thresholds associated with the various available communication protocol(s).

Figure 3C:
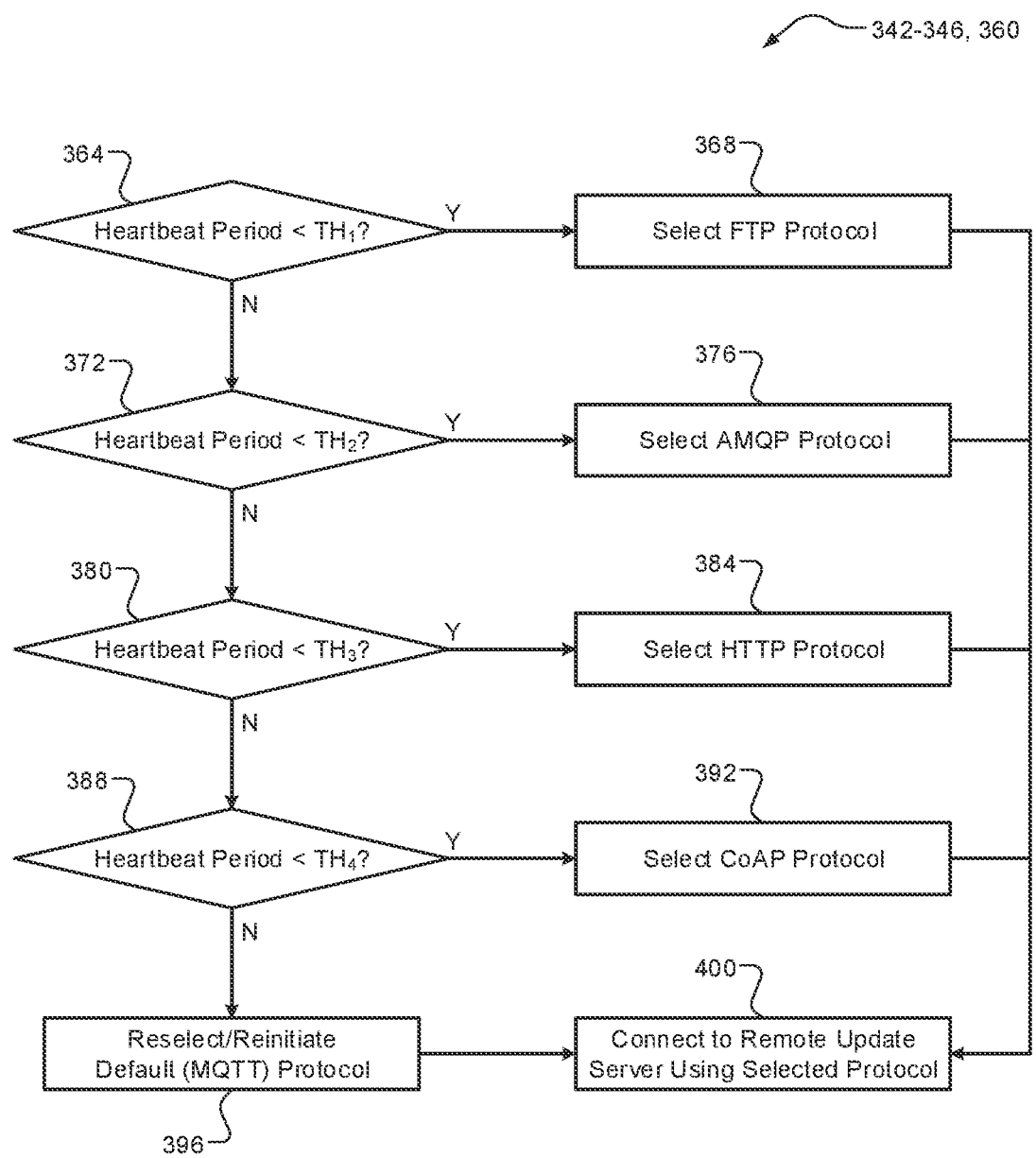

FIG. 3C illustrates a flow diagram of an example heartbeat period based communication protocol desirability analysis and selection procedure 360 according to some implementations of the present application. At 364, the controller 108 determines whether the heartbeat period is less than a first heartbeat threshold ($TH_1$) associated with the FTP protocol. The first heartbeat threshold $TH_1$ could be, for example, approximately 10 ms. When true, the FTP protocol is selected at 368 and the method 360 continues to 400. When false, the method 360 continues to 372. At 372, the controller 108 determines whether the heartbeat period is less than a second heartbeat threshold ($TH_2$) associated with the AMQP protocol. The second heartbeat threshold $TH_2$ could be, for example, approximately 100 ms. When true, the AMQP protocol is selected at 376 and the method 360 continues to 400. When false, the method 360 continues to 380. At 380, the controller 108 determines whether the heartbeat period is less than a third heartbeat threshold (TH$_3$) associated with the HTTP protocol. The third heartbeat threshold TH$_3$ could be, for example, approximately 1 s. When true, the HTTP protocol is selected at 384 and the method 360 continues to 400. When false, the method 360 continues to 388. At 388, the controller 108 determines whether the heartbeat period is less than a fourth heartbeat threshold (TH$_4$) associated with the CoAP protocol. The fourth heartbeat threshold TH$_4$ could be, for example, approximately 5 s. When true, the CoAP protocol is selected at 392 and the method 360 continues to 400. When false, the method 360 continues to 396. At 396, the controller 108 defaults to reselecting or reinitiating the default (MQTT) protocol and the method 360 continues to 400 where the selected protocol is used to connect to the remote update server 116 and receive the OTA update data.

Referring again to FIG. 2, after determining whether there is a more desirable protocol at 220, the controller 108 continues to either 224 or 228. More specifically, when a more desirable protocol is not identified, the method 200 continues to 228, whereas when a more desirable protocol is identified, the method 200 continues to intermediate 224. At 224, the controller 108 switches to the more desirable protocol for continuing the OTA update data download. This step 224 could be included as part of step 220 and the process of FIG. 3C as described above. At 228, the controller 108 determines whether the OTA update data has been fully downloaded/received. When false, the method 200 returns to 216 where another heartbeat message exchange procedure could occur and the OTA update data download continues, including potentially switching protocols. When true (i.e., when the OTA update data download is complete), the method 200 proceeds to 232 where the controller 108 installs or updates the software/firmware associated with the OTA update data. This could include, for example, restarting the associated software/firmware after installing the OTA update data. The method 200 then ends or could return to 204 or 208 for one or more additional cycles, such as for the download of another OTA update data.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An over-the-air (OTA) update control system for a vehicle, the OTA update control system comprising:

a communication transceiver configured for communication with a remote update server via a plurality of different communication protocols; and a controller connected to the communication transceiver and configured to:

determine, from the plurality of different communication protocols, a set of available communication protocols that the controller is configured to utilize for receiving OTA update data;

perform, with the remote update server, a heartbeat exchange procedure that results in a heartbeat period;

determine, for each of the set of available communication protocols, a desirability score, wherein each desirability score is indicative of a similarity of the heartbeat period to a respective heartbeat period threshold associated with a respective communication protocol of the set of available communication protocols;

select the communication protocol having a highest desirability score from the set of available communication protocols;

control receiving of the OTA update data from the remote update server and via the communication transceiver and the selected communication protocol; and update software or firmware executable by the controller using the received OTA update data.

2. The OTA update system of claim 1, wherein the heartbeat exchange procedure includes the receipt of a heartbeat message by the controller, via the communication transceiver and from the remote update server, and the transmission of a heartbeat response by the controller, via the communication transceiver and to the remote update server, and the heartbeat period is defined from the transmission of the heartbeat message until the reception of the heartbeat response by the remote update server.

3. The OTA update system of claim 1, wherein the plurality of different communication protocols includes at least (i) file transfer protocol (FTP), (ii) advanced message queuing protocol (AMQP), (iii) hypertext transfer protocol (HTTP), (iv) constrained application protocol (CoAP), and (v) message queue telemetry transport (MQTT).

4. The OTA update system of claim 1, wherein the plurality of different communication protocols consists of (i) file transfer protocol (FTP), (ii) advanced message queuing protocol (AMQP), (iii) hypertext transfer protocol (HTTP), (iv) constrained application protocol (CoAP), and (v) message queue telemetry transport (MQTT).

5. The OTA update system of claim 3, wherein the controller is configured to utilize the MQTT protocol as a base or default protocol.

6. The OTA update system of claim 5, wherein the controller is configured to select one of FTP, AMQP, HTTP, CoAP, and MQTT based on a comparison between the heartbeat period and the respective heartbeat period thresholds, wherein the different heartbeat thresholds are, ordered from shortest to longest, associated with FTP, AMQP, HTTP, CoAP, and MQTT.

7. The OTA update system of claim 1, wherein the desirability score is weighted based on a plurality of different parameters associated with at least the OTA update data and the plurality of available communication protocols.

8. An over-the-air (OTA) update control method for a vehicle, the OTA update control method comprising:

determining, by a controller, a set of available communication protocols from a plurality of different communication protocols for communication between a communication transceiver and a remote update server, wherein the set of available communication protocols are those of the plurality of different communication protocols that the controller is configured for receiving OTA update data from the remote update server via the communication transceiver;

performing, by the controller and with the remote update server, a heartbeat exchange procedure that results in a heartbeat period;

for each of the set of available communication protocols, determining, by the controller, a desirability score, wherein each desirability score is indicative of a similarity of the heartbeat period to a respective heartbeat period threshold associated with a respective communication protocol of the set of available communication protocols;

selecting, by the controller, the communication protocol having a highest desirability score from the set of available communication protocols;

controlling, by the controller, receiving of the OTA update data from the remote update server via communication transceiver and the selected communication protocol; and updating, by the controller, software or firmware executable by the controller using the received OTA update data.

9. The OTA update method of claim 8, wherein the heartbeat exchange procedure includes the receipt of a heartbeat message by the controller, via the communication transceiver and from the remote update server, and the transmission of a heartbeat response by the controller, via the communication transceiver and to the remote update server, and the heartbeat period is defined from the transmission of the heartbeat message until the reception of the heartbeat response by the remote update server.

10. The OTA update method of claim 8, wherein the plurality of different communication protocols includes at least (i) file transfer protocol (FTP), (ii) advanced message queuing protocol (AMQP), (iii) hypertext transfer protocol (HTTP), (iv) constrained application protocol (CoAP), and (v) message queue telemetry transport (MQTT).

11. The OTA update method of claim 8, wherein the plurality of different communication protocols consists of (i) file transfer protocol (FTP), (ii) advanced message queuing protocol (AMQP), (iii) hypertext transfer protocol (HTTP), (iv) constrained application protocol (CoAP), and (v) message queue telemetry transport (MQTT).

12. The OTA update method of claim 10, wherein the controller is configured to utilize the MQTT protocol as a base or default protocol.

13. The OTA update system of claim 12, wherein the controller is configured to select one of FTP, AMQP, HTTP, CoAP, and MQTT based on a comparison between the heartbeat period and the respective heartbeat period thresholds, wherein the different heartbeat thresholds are, ordered from shortest to longest, associated with FTP, AMQP, HTTP, CoAP, and MQTT.

14. The OTA update method of claim 8, wherein the desirability score is weighted based on a plurality of different parameters associated with at least the OTA update data and the plurality of available communication protocols.

* * * * *